(12) United States Patent
Sarwat et al.

(10) Patent No.: US 9,731,614 B1
(45) Date of Patent: Aug. 15, 2017

(54) MOBILE WIRELESS POWER TRANSFER

(71) Applicants: Arif Sarwat, Davie, FL (US); Shekhar Bhansali, Weston, FL (US); Kang Yen, Miami, FL (US); Masood Moghaddami, Miami, FL (US)

(72) Inventors: Arif Sarwat, Davie, FL (US); Shekhar Bhansali, Weston, FL (US); Kang Yen, Miami, FL (US); Masood Moghaddami, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 15/279,801

(22) Filed: Sep. 29, 2016

(51) Int. Cl.
*H02J 7/00* (2006.01)
*B60L 11/18* (2006.01)
*H02J 7/02* (2016.01)

(52) U.S. Cl.
CPC ......... *B60L 11/1829* (2013.01); *B60L 11/182* (2013.01); *B60L 11/1824* (2013.01); *H02J 7/025* (2013.01); *B60L 2230/22* (2013.01); *B60L 2230/30* (2013.01)

(58) Field of Classification Search
CPC ..... H02J 7/025; B60L 11/182; B60L 11/1824; B60L 11/1829
USPC ........................................ 320/104, 108, 109
See application file for complete search history.

(56) References Cited

U.S. PATENT DOCUMENTS

| | | | | |
|---|---|---|---|---|
| 5,821,731 A | * | 10/1998 | Kuki | B60L 11/1805 320/108 |
| 2010/0219694 A1 | * | 9/2010 | Kurs | H01F 38/14 307/104 |
| 2014/0375272 A1 | * | 12/2014 | Johnsen | B60L 11/16 320/136 |

* cited by examiner

*Primary Examiner* — Edward Tso
*Assistant Examiner* — Aaron Piggush
(74) *Attorney, Agent, or Firm* — Saliwanchik, Lloyd & Eisenschenk (57) ABSTRACT

Mobile power transfer methods and apparatuses for charging electric vehicles both statically and dynamically are provided. A mobile electric charging station can include a chassis, a power source connected to the chassis, a power control system connected to the chassis and the power source, and a wireless power transmitter deployment structure connected to the chassis and the power control system. The power source can be one more of an electric grid connection, a battery, a generator, and solar panels.

13 Claims, 5 Drawing Sheets

MOBILE WIRELESS POWER TRANSFER

GOVERNMENT SUPPORT

The subject invention was made with government support under a research project supported by the National Science Foundation (NSF), under grant number 1553494. The government has certain rights in the invention.

BACKGROUND OF THE INVENTION

Electrical vehicles (EVs) continue to grow in importance as part of the overall transportation fleet. One of EVs main advantages is that they do not rely on burning fossil fuels, and therefore do not directly contribute to air pollution. However, one of the drawbacks is the lack of EV battery charging infrastructure and facilities.

BRIEF SUMMARY OF THE INVENTION

Embodiments of the present invention seek to mitigate or solve one or more problems of the prior art. Embodiments of the present invention include mobile power transfer methods and apparatuses for charging electric vehicles. Embodiments of the present invention include a mobile electric charging station that can charge electric vehicles both statically (while at rest) and dynamically (while in motion).

A mobile electric charging station (MECS) according to the present invention can include a plug-in type EV charger and wireless power transfer (WPT) EV charger. The mobile electric charging station can include an electric power source. The electric power source can include power from a grid, a solar panel array mounted on the MECS, a solar panel array that can be deployed from the MECS, batteries connected to or within the MECS, and a generator/alternator that runs on a liquid or gas fueled motor. The solar panels can be configured to tilt and swivel to maximize electric power production and charge the batteries.

The MECS can include a plug-in control system that monitors the current and voltage delivered through an insulated wire and electric plug, which is attached to and charges the EV. The MECS can also include a deployable WPT transmitter (or pad) that couples with a receiver of an electric vehicle (EV) to transfer power. The WPT transmitter can deploy from beneath the body of the MECS or can deploy from the back, sides, or front of the MECS. The transmitter can have a supporting rail that can extend, contract, and pivot to control the position of the WPT transmitter. The supporting rail and the transmitter can have wheels that support the supporting rail while moving or at rest. If the MECS is at rest, stands, feet, and legs can be provided beneath the supporting rail and the transmitter pad. The WPT transmitter can also have a mechanism that raises and lowers to optimize electromagnetic coupling with the WPT receiver of an EV. The MECS can include a WPT control system that includes a power stabilizer, a controller, a converter, and a compensator.

In some embodiments, the MECS can be encompassed in a semi-trailer truck (including a semi-trailer and a truck/tractor). The truck or tractor portion can provide the motive force needed to move the semi-trailer and can also provide power for charging EVs. The electricity for charging EVs can come from the truck/tractor directly or a power take-off (PTO) can be provided by the tractor to power a generator housed within the semi-trailer. The tractor portion can run on battery power and liquid or gas fuels (e.g., methane, natural gas, propane, diesel, gasoline, alcohol, etc.). In some embodiments, the tractor can separate from the trailer portion and the trailer portion can stand alone and remain fully functional as a charging station. The stand alone trailer portion can have a separate liquid or gas fueled engine or turbine (e.g., methane, natural gas, propane, diesel, gasoline, alcohol, etc.).

In some embodiments, the entire MECS can be housed within a single unit. That is, the method for powering the MECS and supplying power for the EVs can be included in a single structure rather than the semi-trailer truck embodiments previously discussed.

An MECS according to an embodiment of the present invention can include a power and energy metering system to keep track of how much power is consumed by an EV. An electronic payment system can also be included. The electronic payment system can accept cash, credit cards, and other forms of electronic payment including wireless electronic payment.

DETAILED DESCRIPTION OF THE INVENTION

Two of the most common methods of charging EVs include the direct plug-in and wireless power transfer (WPT). In the direct plug-in method, a power source is coupled to the electric vehicle directly using a conductive wire. In WPT, however, electric power is transferred to EVs via electromagnetic induction. Both the direct plug-in method and WPT have their own advantages and disadvantage. For example, the direct plug-in method is generally more efficient, requires less equipment, and is in more widespread use. However, WPT tends to be more convenient and is robust with respect to operating environments and minimizes the chances of shock and electrical sparking.

Embodiments of the present invention include mobile power transfer methods and apparatuses for electric vehicles. Embodiments of the present invention include a mobile electric charging station that can charge electric vehicles both statically (while in motion) and dynamically (while at rest).

Figures 1, 2:
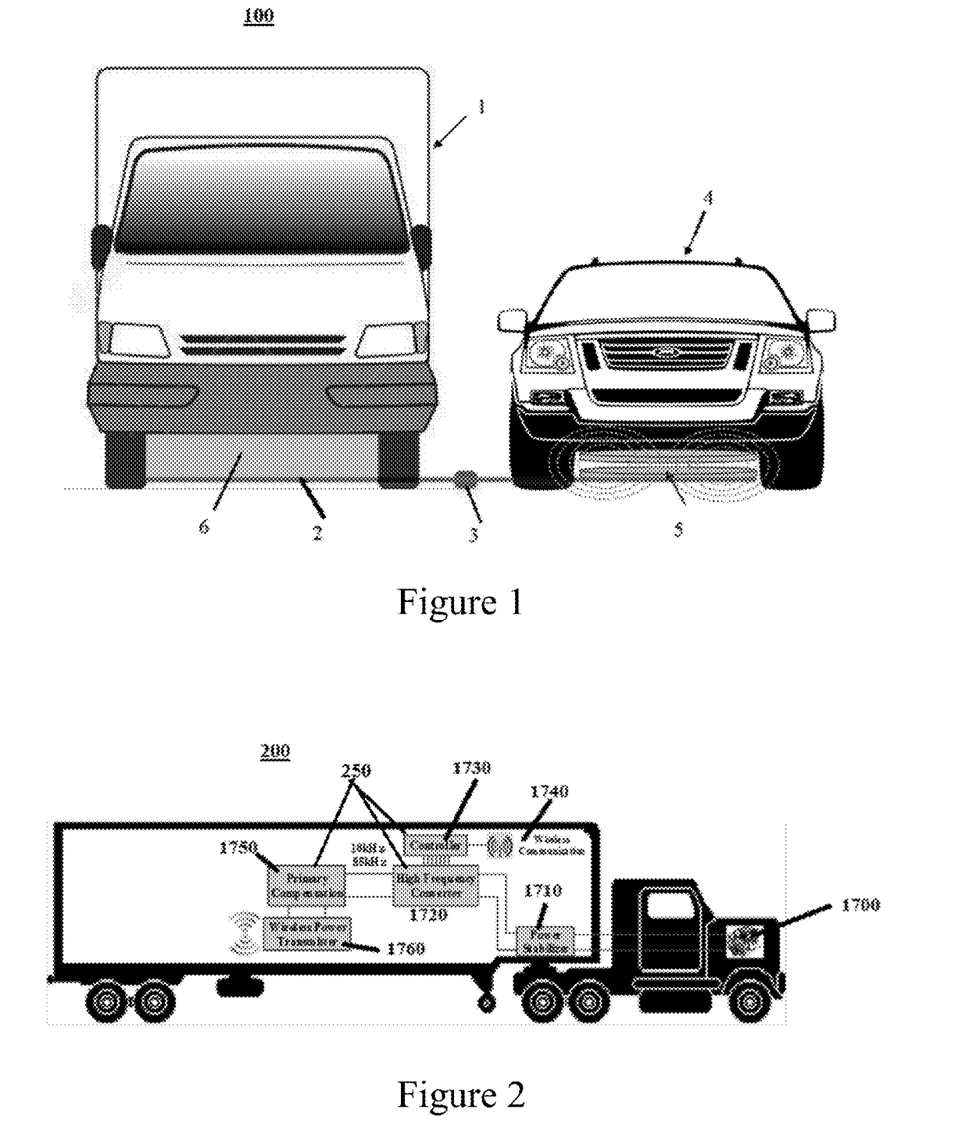
FIG. 1 shows a mobile electric charging station (MECS) according to an embodiment of the present invention.
FIG. 2 shows a semi-trailer truck MECS according to an embodiment of the present invention.

FIG. 1 shows a mobile electric charging station (MECS) 100 according to an embodiment of the present invention. The mobile electric charging station (MECS) 100 can be used for both static (at rest) and dynamic (while in motion, e.g., while driving down the road) charging applications. Dynamic charging can be useful for EVs that need power while driving down the road (e.g., in emergency situations when there is a power failure or the EV batteries are empty or dysfunctional). Static charging can be particularly useful at events or destinations (e.g., fairs, concerts, etc.) where permanent charging facilities are unavailable or overflow capacity is needed. In addition, static mobile electric charging stations (MECS) 100 according to the present invention can act as a permanent or semi-permanent solution as it can contain all necessary charging equipment in an easily deployable skid form.

The MECS 100 of FIG. 1 includes a truck or chassis 1, a deployment structure 6, a sliding rail 2, a frame support 3, and a wireless power transmitter 5. An electrically powered vehicle 4 with a WPT receiver is also shown. The deployment structure 6 can open through a hatch in the bottom of the MECS 100 and can include the sliding rail 2, the frame support 3, and the WPT transmitter 5. The frame support 3 can include wheels that roll along the ground if the MECS 100 were to be used dynamically. The wheels can also assist as the sliding rail 3 deploys from under or from the side of the MECS 100. Instead of deploying to the side of a truck or chassis 1, as shown, the deployment structure 6, the sliding rail 2, the frame support 3, and the wireless power transmitter 5 can similarly deploy out of the front or back of the of the truck or chassis 1 (not shown). In addition, the MECS 100 can include one, two, three, four, five, six, seven, eight or more deployment structures 6. This multi-deployment structure configuration can be particularly useful in static applications.

Once the deployment structure 6 extends vertically downward from the MECS 100, the sliding rail 2 can extend out horizontally to place the WPT transmitter 5 beneath the EV 4. The WPT transmitter 5 can also have wheels beneath it for structural support and have a mechanism for it to be raised and lowered to optimize electric coupling with the receiver of the EV 4.

FIG. 2 shows a semi-trailer truck MECS 200 according to an embodiment of the present invention. FIG. 2 shows the power control system 250 of an MECs 200 according to an embodiment of the present invention. The power control system 250 can include a power stabilizer 1710, a high frequency converter 1720, a controller 1730, and primary compensation circuitry 1750. The semi-trailer truck embodiment of FIG. 2 includes a liquid or gas fueled engine 1700 that can generate electric power and be connected to a power stabilizer 1710 that helps to control power fluctuations. The electric power can come directly from the liquid or gas powered engine 1700 or from a generator that is driven by a power-take-off (PTO) from the fossil fuel powered engine 1700. A high frequency converter 1720 can be used to drive primary compensation circuitry 1750 and a wireless power transmitter 1760 at a desired frequency (e.g, the best frequency possible to maximize efficiency or net power transfer from the wireless power transmitter to the receiver of an EV). The high frequency converter 1720 can be connected to a controller 1730 that controls the power transmission process. The controller 1730 can be connected to a wireless communication unit 1740 for accepting wireless electronic forms of payment. Instead of wireless payment, traditional forms of payment such as credit cards and even cash can be accepted through an electronic payment system.

Figure 3:
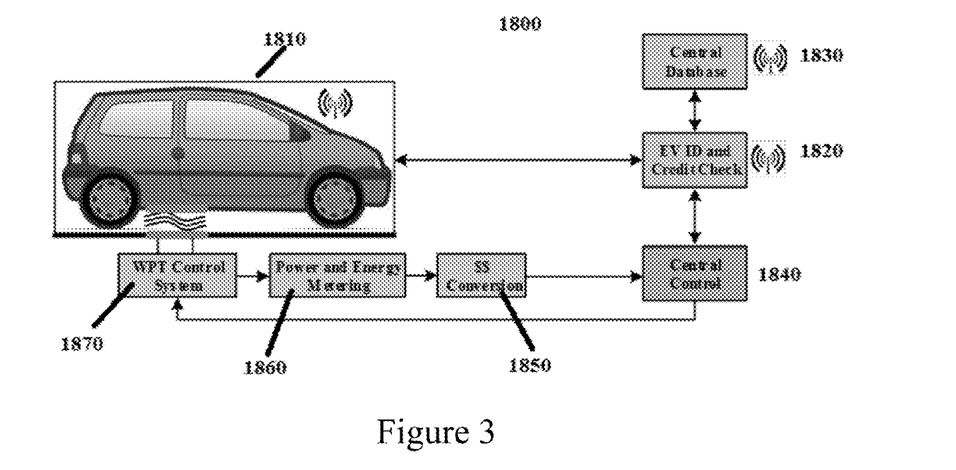
FIG. 3 shows a power metering and payment system according to an embodiment of the present invention.

FIG. 3 shows a power metering and payment system 1800 according to an embodiment of the present invention. According to an embodiment of the present invention, an EV ID and credit check unit 1820 of the billing system is equipped with a wireless communication unit that can communicate with an EV 1810 to get identification and authorization information. Moreover, the EV ID and credit check unit 1820 can gain access to a central database 1830 through a wireless internet connection to check ID and credentials of the EV 1810 and acquire permission for charging the EV 1810. Radio frequency identification (RFID) can be used as an electronic ID for the EV. When the EV ID and credit check unit 1820 recognizes the ID of the EV and obtains the authorization to transfer power, such information is transmitted to a central control 1840. Upon receiving the ID and authorization from the EV ID and credit check unit 1820, the central control 1840 starts the fee conversion unit 1850 (which determines the total charge based on total energy delivered as well as other factors including whether the MECS is operating off grid or liquid or gas power), the power and energy metering unit 1860, and the WPT control system 1870 to start the power transfer processes (either wireless or plug-in). The billing system 1800 can have a protection mechanism including firewalls to avoid cyber-attacks.

Figure 4:
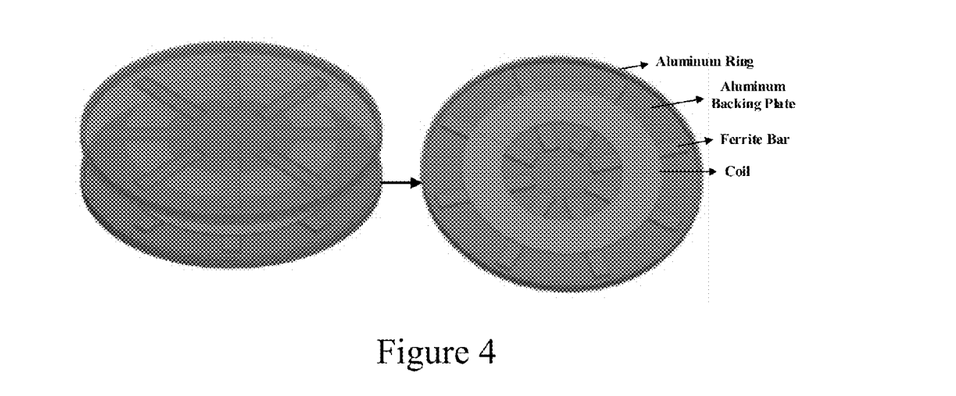
FIG. 4 shows an example of a wireless power transmitter pad that can be incorporated in embodiments of the present invention.

FIG. 4 shows an example of a wireless power transmitter, such as the wireless power transmitter 5 of FIG. 1, which can be incorporated in embodiments of the present invention. The wireless power transmitter pad 400 can include coils 401, ferrite bars 402 for improving efficiency and an aluminum ring 404 and back plate 403. The transmitter can be designed to minimize magnetic pollution and maximize efficiency. However, the wireless power transmitter pad 400 in FIG. 4 is only one embodiment and any wireless power transmitter known in the art can be incorporated into embodiments of the present invention.

Figure 5:
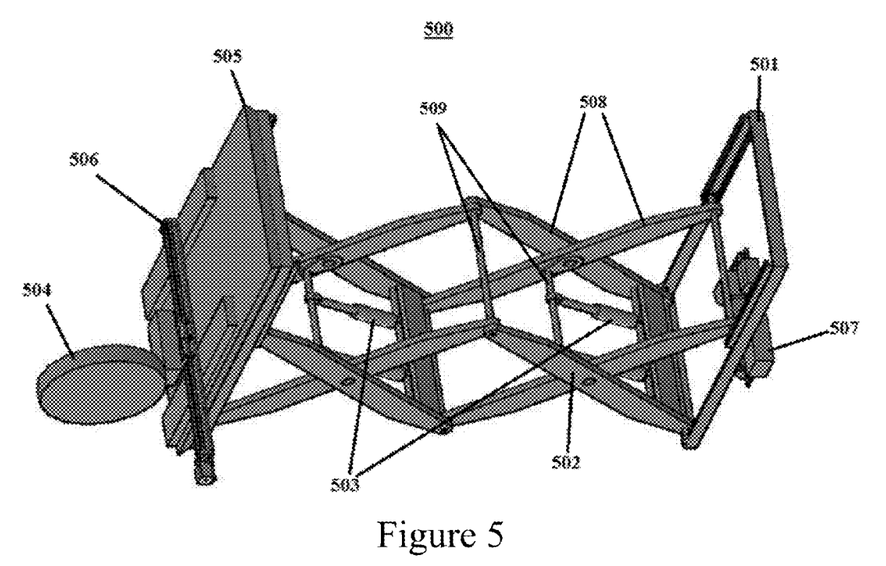
FIG. 5 shows a wireless power transmitter deployment structure according to an embodiment of the present invention.

FIG. 5 shows a wireless power transmitter deployment structure 500 according to an embodiment of the present invention. The wireless power transmitter deployment structure 500 of FIG. 5 includes a mounting frame 501, a scissoring extension structure 502, hydraulic (or electric or pneumatic) rams 503, an actuator driver 507 that can drive the rams, a wireless power transmitter pad 504, a transmitter frame 505, and a horizontal adjustment bar 506. The wireless power transmitter deployment structure 500 can deploy out of the back, side, or bottom of a chassis or truck. The chassis can have wheels or simply be a frame (or a skid, which can have wheels) to house, transport, and protect the MECS equipment from the elements. The skid can be transported around and delivered to a temporary or permanent location using a truck.

The mounting frame 501 can attach to the chassis or truck. The actuator driver 507 can drive the rams 503 to extend the scissoring extension structure 502 to deploy the wireless power transmitter deployment structure 500 below, behind, or to the side of a chassis. The scissoring extension structure 502 can include eight crossing beams 508 and four rotation rods 509. Other options besides rams 503 can be used to deploy the scissoring extension structure 502. For example, a threaded extension rod (not shown) can be provided and the actuator driver 507 can rotate a nut and threaded bar combination which extends when rotated, engaging and extending the scissoring extension structure 502. The transmitter frame 505 can extend in a direction perpendicular to the scissoring extension structure 502 to raise or lower the wireless power transmitter pad 504 or to extend and retract the wireless power transmitter pad 504, depending on how the wireless power transmitter deployment structure 500 is connected to the chassis. Additionally, the horizontal adjustment bar 506 can move the wireless power transmitter pad 504 perpendicularly relative to the transmitter frame 505 and the scissoring extension structure 502, allowing 360 degree movement of the wireless power transmitter pad 504. Furthermore, the wireless power transmitter pad 504 can twist and tilt to align with the wireless power receiver of an EV, depending on the wireless power transmitter deployment structure 500 and the position of the EV. In addition, detailed wireless power transmitter pad 504 can be made to improve power transfer efficiency.

The WPT control system 1870 can determine the quality of the connection between the wireless power transmitter pad 504 and an EV and can adjust the wireless power transmitter deployment structure 500 accordingly to maximize power transfer and efficiency (both statically and dynamically). The wireless power transmitter deployment structure 500 can be made of metals (e.g., aluminum and steel), plastics, or both and can be attached to the load bearing portion of a chassis using hardware (e.g., bolts or clamps), welds, or it can be integrated into the chassis during chassis fabrication.

Figure 6:
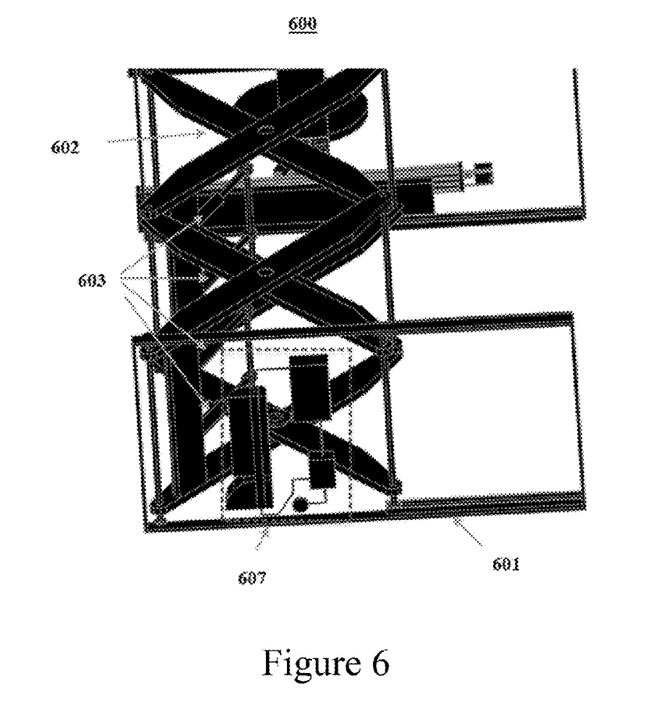
FIG. 6 shows a wireless power transmitter deployment structure according to an embodiment of the present invention.

FIG. 6 shows another view of a wireless power transmitter deployment structure 600 according to an embodiment of the present invention. The wireless power transmitter deployment structure 600 can include a scissoring extension structure 602, rams 603, a deployment structure or mounting frame 601, an actuator driver 607, and eight crossing beams that are fixed together with rotation steel rods allowing horizontal movement of the structure. The deployment structure or mounting frame 601 can be fixed directly to an MECS by any conventional means (e.g., welds or bolts). Additional support beams can be added to account for the strain of horizontal movement. The actuator driver 607 and rams 603 can operate on compressed air (and can include an air compressor), compressed or liquid carbon dioxide, or hydraulic fluid. The actuator driver 607 can include a valve control and a compressor and run on electricity. The actuator driver 607 can further include a digital controller and it can communicate with the controller 1730 to optimize wireless power transfer.

Figure 7:
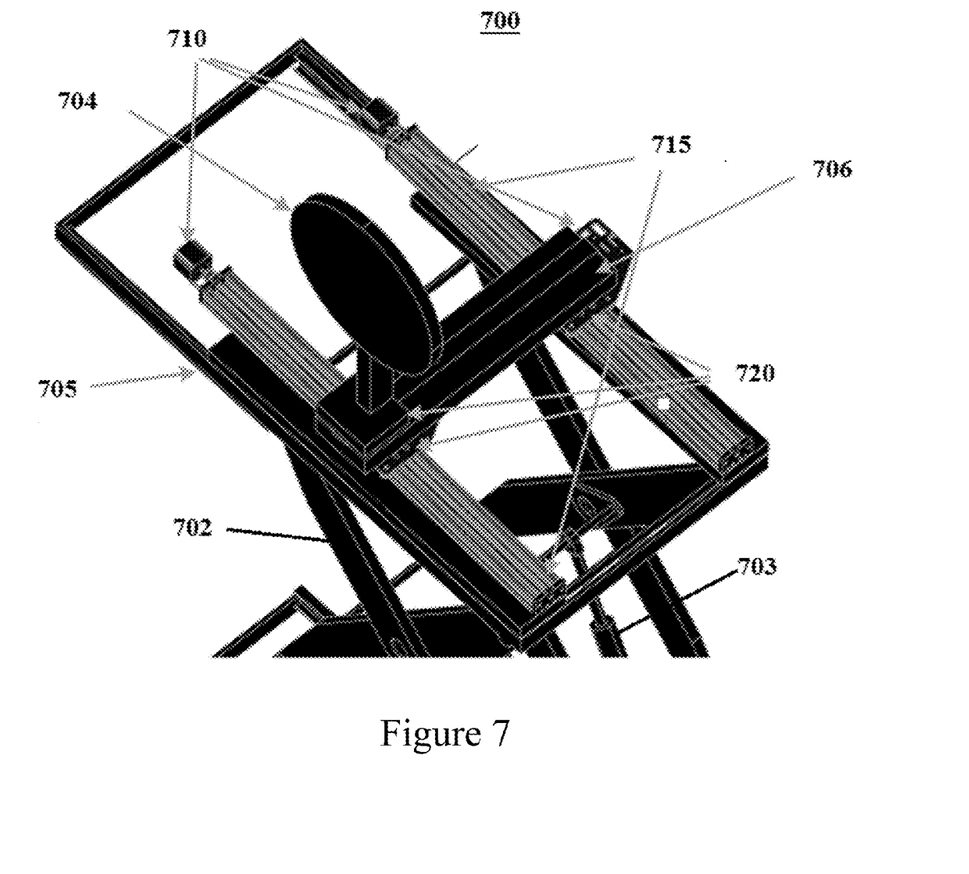
FIG. 7 shows a wireless power transmitter deployment structure according to an embodiment of the present invention.

FIG. 7 shows a wireless power transmitter deployment structure 700 according to an embodiment of the present invention. The wireless power transmitter deployment structure 700 can include gantries 720 and rails 715 (e.g., c-rails made of extruded aluminum), which allow the wireless power transmitter pad 704 to move in the x-axis direction, as part of the transmitter frame 705. Stepper motors and drivers 710 (e.g., NEMA 23 stepper motors and drivers) can be provided to move the wireless power transmitter pad 704 on the rails 715. A horizontal adjustment bar 706, including a stepper motor or servo motor (not shown), can be provided to move the wireless power transmitter pad 704 in the y-axis. FIG. 7 also shows the rams 703 that can extend the scissoring extension structure 702 in the z-axis direction. Therefore, the wireless power transmitter pad 704 can have controlled movement in the x-axis, y-axis, and z-axis. In addition, the wireless power transmitter pad 704 can be configured to twist and tilt (e.g. using servomotors) to further optimize wireless transmitter coupling.

Figure 8:
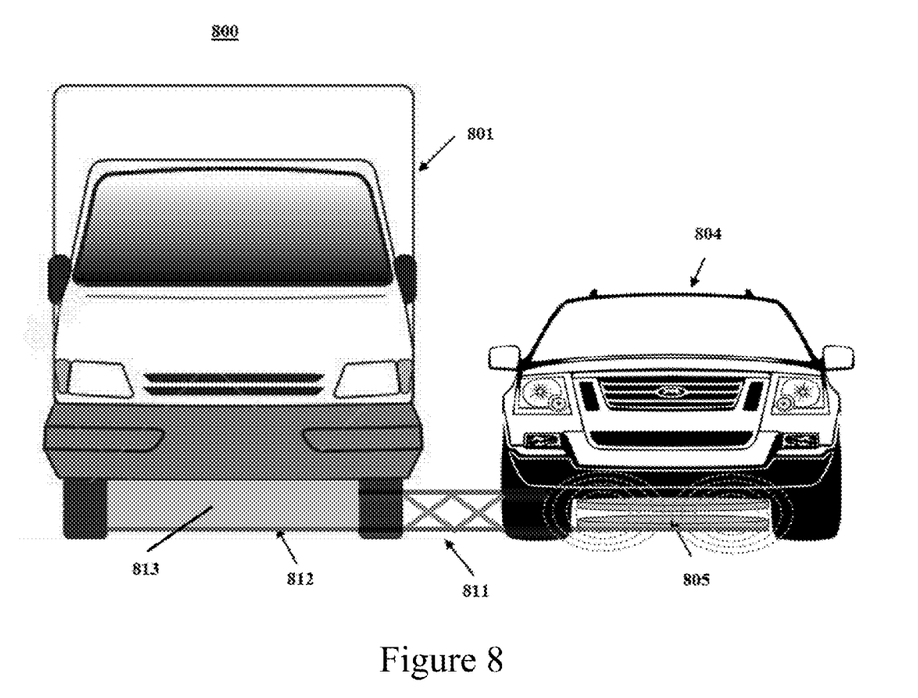
FIG. 8 shows a mobile electric charging station (MECS) according to an embodiment of the present invention.

FIG. 8 shows another embodiment of a mobile electric charging station (MECS) 800 according to an embodiment of the present invention. The mobile electric charging station (MECS) 800 can be used for both static (at rest) and dynamic (while in motion, e.g., while driving down the road) charging applications. The MECS 800 of FIG. 8 includes a truck or chassis 801, a deployment structure 813, a scissoring structure 811, and a wireless power transmitter 805. An electrically powered vehicle 804 with a WPT receiver is also shown. The deployment structure 813 can extend through a hatch in the bottom of the MECS 800 and can include a scissoring structure 811 that extends outward from underneath the MECS 800 and underneath an electrically powered vehicle 804.

The scissoring structure 811 can take the form of any of the embodiments of FIGS. 5, 6, and 7. Therefore, the wireless power transmitter 805 can have six degrees of freedom (left/right, front/back, up/down, pitch, yaw, and roll) for proper alignment with the WPT receiver of an electrically powered vehicle 804. The scissoring structure 811 can include a support structure (not shown) to assist in supporting the weight of the scissoring structure 811 and the wireless power transmitter 805. The support structure can also have wheels (not shown) that can roll along the ground if the MECS 800 were to be used dynamically. The support can also be located directly under the wireless power transmitter 805, instead of underneath the middle portion of the scissoring structure 811. Instead of deploying to the side of a truck or chassis 801, as shown, the scissoring structure 811 can similarly deploy out of the other side or back of the of the truck or chassis 801 (not shown). In addition, the MECS 800 can include one, two, three, four, five, six, seven, eight or more deployment structures 813. This multi-deployment structure configuration can be particularly useful in static applications.

The subject invention includes, but is not limited to, the following exemplified embodiments.

Embodiment 1

A mobile electric charging station comprising:
a chassis;
a power source connected to the chassis;
a power control system connected to the chassis;
a means for delivering electric power to an EV.

Embodiment 2

The mobile electric charging station of Embodiment 1, wherein the power source is one or more of an electric grid connection, a battery, a generator, and solar panels.

Embodiment 3

The mobile electric charging station of any of Embodiments 1 to 2, further comprising a liquid or gas engine to drive the generator.

Embodiment 4

The mobile electric charging station of any of Embodiments 1 to 3, wherein the means for delivering electric power to an EV is one, two, three, four, five, six, seven, eight or more insulated plug-in-wire combinations and/or wireless power transmitter systems.

Embodiment 5

The mobile electric charging station of any of Embodiments 1 to 4, wherein the power control system includes a power stabilizer, a high frequency converter, a controller, and primary compensation circuitry.

Embodiment 6

The mobile electric charging station of any of Embodiments 1 to 6, wherein the chassis is a box truck, or a movable skid, or a semi-trailer.

Embodiment 7

The mobile electric charging station of any of Embodiments 1 to 6, further comprising a tractor connected to the semi-trailer or a truck with a bed and winch suitable for picking up the skid.

Embodiment 8

The mobile electric charging station of any of Embodiments 1 to 7, further comprising a wireless power transmitter deployment structure.

Embodiment 9

The mobile electric charging station of any of Embodiments 1 to 8, wherein the wireless power transmitter deployment structure includes a mounting frame, rams, a scissoring extension structure, an actuator driver, a transmitter frame, a wireless power transmitter pad, and a horizontal adjustment bar.

Embodiment 10

The mobile electric charging station of any of Embodiments 1 to 9, rams and actuator driver run on compressed gas or hydraulics.

Embodiment 11

The mobile electric charging station of any of Embodiments 1 to 10, further comprising an air compressor connected to the chassis.

Embodiment 12

The mobile electric charging station of any of Embodiments 1 to 11, wherein the wireless power transmitter pad can tilt and twist.

Embodiment 13

The mobile electric charging station of any of Embodiments 1 to 12, wherein the wireless power transmitter deployment structure includes an actuator driver that can rotate a nut and threaded bar combination, which engages and extends a scissoring extension structure.

Embodiment 14

The mobile electric charging station of any of Embodiments 1 to 13, further comprising two, or three, or four, or five, or six, or seven, or eight means for delivering electric power to EVs.

Embodiment 15

The mobile electric charging station of any of Embodiments 1 to 14, wherein the deployment structure is made of one or more of aluminum, steel, and plastic.

Embodiment 16

The mobile electric charging station of any of Embodiments 1 to 15, further comprising a power metering and payment system.

Embodiment 17

The mobile electric charging station of any of Embodiments 1 to 16, wherein the power metering and payment system includes an EV ID and credit check unit, a central database, a central control, a fee conversion unit, a and power energy metering unit.

Embodiment 18

The mobile electric charging station of any of Embodiments 1 to 17, further comprising two, or three, or four, or five, or six, or seven, or eight power metering and payment systems for charging multiple EVs simultaneously.

Embodiment 19

The mobile electric charging station of any of Embodiments 1 to 18, wherein the wireless power transmitter structure deploys from one more of the back, sides, front, or bottom of the chassis.

Embodiment 20

The mobile electric charging station of any of Embodiments 1 to 19, wherein the deployment structure includes a scissoring structure suitable for extending out from underneath the MECS and below an electric vehicle.

Embodiment 101

A method of charging EVs comprising:
providing any of the mobile electric charging stations of Embodiments 1 to 19;
using the mobile electric charging station to charge one more cars.

Embodiment 102

The method of Embodiment 101, wherein mobile electric charging station is being used statically.

Embodiment 103

The method of Embodiment 101, wherein mobile electric charging station is being used dynamically.

Embodiment 104

The method of Embodiment 101, wherein mobile electric charging station is deployed statically and separated from its mode of transportation.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section, if present) are incorporated by reference in their entirety, including all figures and tables, to the extent they are not inconsistent with the explicit teachings of this specification.

What is claimed is:

1. A mobile electric charging station comprising:
   a roadworthy chassis;
   a power source connected to the roadworthy chassis;
   a power control system connected to the roadworthy chassis and the power source; and
   a wireless power transmitter deployment structure that deploys from the roadworthy chassis and is connected to the power control system,
   the wireless power transmitter deployment structure comprising a mounting frame connected to a side of the roadworthy chassis, a scissoring extension structure that extends horizontally from the roadworthy chassis and connected to the mounting frame a transmitter frame connected to the scissoring extension structure, and a wireless power transmitter having upward and downward mobility and connected to the transmitter frame.

2. The mobile electric charging station of claim 1, wherein the power source is an electric grid connection, or a battery, or a generator, or solar panels.

3. The mobile electric charging station of claim 2, further comprising a liquid or gas powered engine to drive the generator.

4. The mobile electric charging station of claim 2, further comprising an insulated plug-in-wire combination connected to the power control system and suitable for charging electrical vehicles (EVs).

5. The mobile electric charging station of claim 1, wherein the power control system includes a power stabilizer, a high frequency converter, a controller, and primary compensation circuitry.

6. The mobile electric charging station of claim 2, wherein the roadworthy chassis is a semi-trailer.

7. The mobile electric charging station of claim 2, wherein the roadworthy chassis is a movable skid.

8. The mobile electric charging station of claim 2, further comprising a power metering and payment system.

9. The mobile electric charging station of claim 3, wherein the wireless power transmitter has six degrees of freedom.

10. The mobile electric charging station of claim 8, wherein the power metering and payment system includes an EV ID and credit check unit, a central database, a central control, a fee conversion unit, a and power energy metering unit.

11. The mobile electric charging station of claim 1, comprising two or more wireless power transmitter deployment structures connected to the roadworthy chassis and the power control system.

12. A method of charging an electric vehicle comprising providing the mobile electric charging station of claim 1 and putting the mobile electric charging station in motion while simultaneously charging an electric vehicle.

13. A mobile electric charging station comprising:
   a roadworthy chassis;
   a power source including a combustion engine attached to an electric generator and connected to the roadworthy chassis;
   a power metering and control system connected to the roadworthy chassis and the power source;
   a power metering system and a wireless payment system; and
   a wireless power transmitter deployment structure that deploys from the roadworthy chassis and is connected to the power control system,
   the wireless power transmitter deployment structure comprising a mounting frame connected to a side of the roadworthy chassis, a scissoring extension structure that extends horizontally from the roadworthy chassis and connected to the mounting frame, a transmitter frame connected to the scissoring extension structure, and a wireless power transmitter having upward and downward mobility and connected to the transmitter frame.

* * * * *

UNITED STATES PATENT AND TRADEMARK OFFICE
CERTIFICATE OF CORRECTION

PATENT NO. : 9,731,614 B1  
APPLICATION NO. : 15/279801  
DATED : August 15, 2017  
INVENTOR(S) : Sarwat et al.

It is certified that error appears in the above-identified patent and that said Letters Patent is hereby corrected as shown below:

In the Specification

Column 1, Lines 5-8:
"The subject invention was made with government support under a research project supported by the National Science Foundation (NSF), under grant number 1553494. The government has certain rights in the invention."

Should read:
--This invention was made with government support under 1553494 awarded by the National Science Foundation. The government has certain rights in the invention.--

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*